L. HELD.
ATTACHMENT FOR COOKING UTENSILS.
APPLICATION FILED JUNE 7, 1918.
1,290,186.
Patented Jan. 7, 1919.
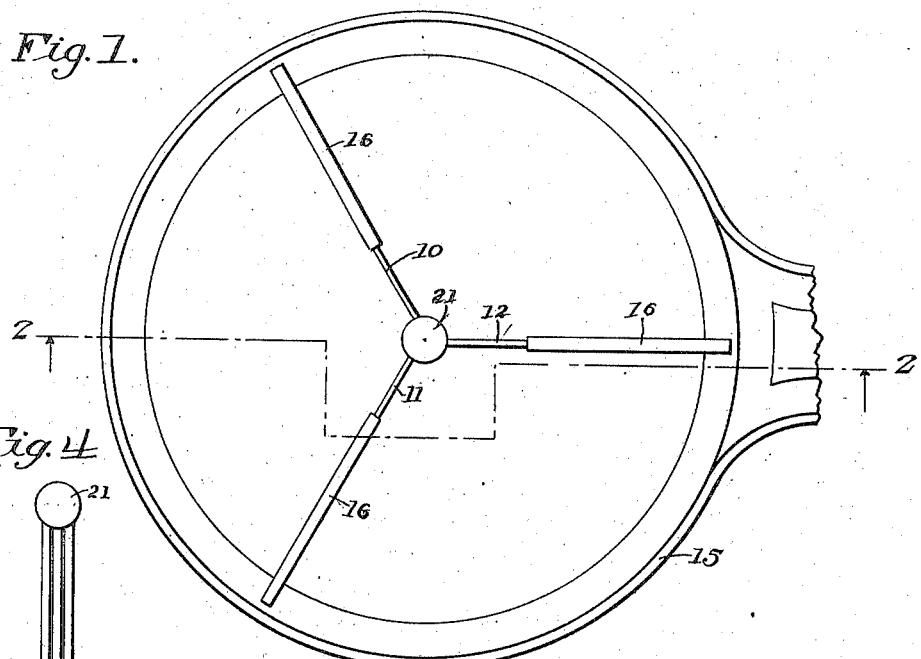
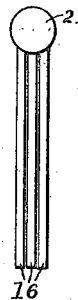
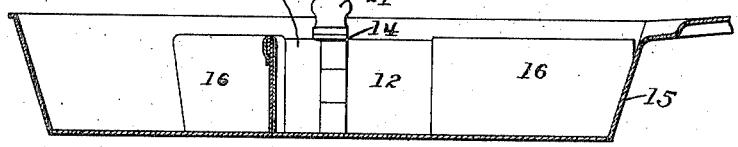
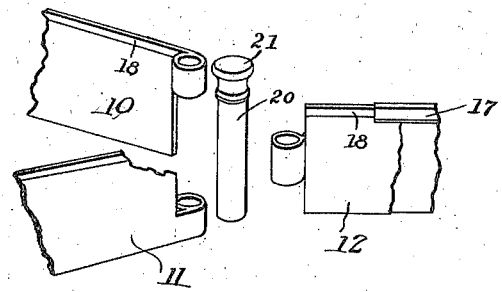
Witnesses
Le Roy Kauffman.
Inventor
Louis Held.
By Victor J. Evans
Attorney

UNITED STATES PATENT OFFICE.

LOUIS HELD, OF SAN FRANCISCO, CALIFORNIA.

ATTACHMENT FOR COOKING UTENSILS.

1,290,186.  Specification of Letters Patent.  Patented Jan. 7, 1919.

Application filed June 7, 1918. Serial No. 238,719.

*To all whom it may concern:*

Be it known that I, LOUIS HELD, a citizen of the United States, residing at San Francisco, in the county of San Francisco and State of California, have invented new and useful Improvements in Attachments for Cooking Utensils, of which the following is a specification.

This invention relates to an attachment for cooking utensils, and the principal object is to provide detachable means for use with utensils of different sizes, and designed to divide the space within the receptacle into a plurality of compartments in order that different kinds of food may be cooked without interference one with the other.

A further object is to provide a device comprising a plurality of blades or the like pivotally connected and extending radially with reference to a central pin, these arms being foldable when not in use.

A still further object is to provide in a device constructed as specified a plurality of arms carrying longitudinally movable members constituting extensions of said arms, with means for guiding the extension members and permitting sliding movement.

In the accompanying drawings:

Figure 1 is a top plan view.

Fig. 2 is a vertical section.

Figs. 3 and 4 are detail views described below.

A plurality of blades 10, 11 and 12 are pivotally connected as shown at 14 and are adapted for movement with reference to each other about said pivot as a center, whereby the blades may be positioned at different distances apart forming compartments of varying sizes. These arms constitute division strips or walls and may be of suitable size for the purpose intended.

The device is placed within any ordinary cooking utensil designated 15, and in order to provide for different sizes of utensils the blades carry members designated 16, which constitute extensions for the blades being slidable with reference thereto. These extensions carry turned over portions 17 engaging the ribs 18 on the upper edges of the blades or division members respectively. The pivot 20 carries a handle 21, for convenience in handling the attachment, and the latter when not in use is folded into the form shown in Fig. 4.

What is claimed is:

1. In an attachment for a cooking utensil, a plurality of pivotally connected members extending radially with reference to a central point, and means for varying the length of said members, the pivotally connected members acting as vertical walls dividing the space within the utensil into separate compartments.

2. In an attachment for a cooking utensil, a plurality of pivotally connected members extending radially from a central point, and a slidable member carried by each pivoted member and movable longitudinally with reference thereto and adapted to form an extension thereof, the pivotally connected members acting as vertical walls dividing the space within the utensil into separate compartments.

3. In an attachment for a cooking utensil, a plurality of pivotally connected members, and means for varying the length of said members, the pivotally connected members acting as vertical walls dividing the space within the utensil into separate compartments.

4. An attachment for a cooking utensil comprising a plurality of division members having hinged connection with each other, and blades each having a turned over portion on its edge slidably engaging the upper edge of a division member and adapted to form an extension thereof, the pivotally connected members acting as vertical walls dividing the space within the utensil into separate compartments.

5. An attachment for cooking utensils, comprising a central pivot, and radially arranged, extensible partitions pivotally secured thereby, said pivot and partitions being adapted to rest upon the bottom of a utensil in perpendicular relation thereto.

In testimony whereof I affix my signature.

LOUIS HELD.